(12) United States Patent
Pinelli et al.

(10) Patent No.: US 12,110,237 B2
(45) Date of Patent: Oct. 8, 2024

(54) ALGAE SEPARATION SYSTEM

(71) Applicant: AECOM, Los Angeles, CA (US)

(72) Inventors: David J. Pinelli, Asheville, NC (US); Daniel J. Levy, Fort Lauderdale, FL (US); William H. Colona, III, Tallahassee, FL (US)

( * ) Notice: Subject to any disclaimer, the term of this patent is extended or adjusted under 35 U.S.C. 154(b) by 268 days.

(21) Appl. No.: 17/303,175

(22) Filed: May 21, 2021

(65) Prior Publication Data
US 2022/0041469 A1    Feb. 10, 2022

Related U.S. Application Data

(60) Provisional application No. 63/029,253, filed on May 22, 2020.

(51) Int. Cl.
| | |
|---|---|
| C02F 1/24 | (2023.01) |
| B01D 21/00 | (2006.01) |
| B01D 21/01 | (2006.01) |
| B01D 21/08 | (2006.01) |
| B01D 21/24 | (2006.01) |
| C02F 1/40 | (2023.01) |
| C02F 1/52 | (2023.01) |
| A01G 33/00 | (2006.01) |
| C02F 1/00 | (2023.01) |
| C02F 103/00 | (2006.01) |

(52) U.S. Cl.
CPC ............ *C02F 1/24* (2013.01); *B01D 21/0084* (2013.01); *B01D 21/01* (2013.01); *B01D 21/08* (2013.01); *B01D 21/2444* (2013.01); *C02F 1/40* (2013.01); *C02F 1/5281* (2013.01); *A01G 33/00* (2013.01); *C02F 2001/007* (2013.01); *C02F 2103/007* (2013.01); *C02F 2301/022* (2013.01)

(58) Field of Classification Search
CPC ........................................................ C02F 1/24
See application file for complete search history.

(56) References Cited

U.S. PATENT DOCUMENTS

| | | | | |
|---|---|---|---|---|
| 4,216,085 | A * | 8/1980 | Chittenden | ............... C02F 1/24 |
| | | | | 210/706 |
| 4,255,262 | A * | 3/1981 | O'Cheskey | .......... B03D 1/1406 |
| | | | | 210/221.2 |
| 2003/0173288 | A1* | 9/2003 | Arnaud | .............. B01D 21/2433 |
| | | | | 210/512.1 |
| 2013/0118988 | A1* | 5/2013 | Xu | ............................ C02F 9/00 |
| | | | | 210/151 |

* cited by examiner

*Primary Examiner* — Peter Keyworth
(74) *Attorney, Agent, or Firm* — Knobbe, Martens, Olson & Bear, LLP

(57) ABSTRACT

An algae separation system can comprise a tank comprising an algae separation chamber. The system can comprise a first inlet to supply algae-containing water to a mixing region of the algae separation chamber. The system can comprise a second inlet to supply gas-containing water comprising dissolved gas to the mixing region of the algae separation chamber. The system can comprise a bubble generator in fluid communication with the second inlet, the bubble generator configured to generate a plurality of bubbles from the gas-containing water and to supply the plurality of bubbles to the mixing region to mix with the algae-containing water.

23 Claims, 12 Drawing Sheets

ALGAE SEPARATION SYSTEM

CROSS-REFERENCE TO RELATED APPLICATIONS

This application claims priority to U.S. Provisional Patent Application No. 63/029,253, filed May 22, 2020, the entire contents of which are incorporated by reference herein in their entirety and for all purposes.

BACKGROUND

Field of the Invention

The field relates to an algae capture, separation, or harvesting system.

Description of the Related Art

It can be important to separate algae from liquids, such as water, in a variety of contexts. For example, algae can be separated from water and used in fuel production. Further, natural water bodies, such as lakes, rivers, etc., can become impaired due to high concentration of algae fueled by nutrients in the water. Some types of algae can have negative impacts on the environment, wildlife, and human health. Accordingly, there remains a continuing need to remove algae from natural water sources.

SUMMARY

In one embodiment, an algae separation system includes: a tank comprising an algae separation chamber; a first inlet to supply algae-containing water to a mixing region of the algae separation chamber; a second inlet to supply gas-containing water comprising dissolved gas to the mixing region of the algae separation chamber; and a bubble generator in fluid communication with the second inlet, the bubble generator configured to generate a plurality of bubbles from the gas-containing water and to supply the plurality of bubbles to the mixing region to mix with the algae-containing water.

In some embodiments, the algae separation chamber comprises a flotation region above the first inlet and the bubble generator, the bubble generator and the first inlet positioned such that the plurality of bubbles from the gas-containing liquid bond to algae particles in the algae-containing water and float the algae particles in the flotation region. In some embodiments, the system can include a skimmer configured to skim separated algae from a surface of the flotation region. In some embodiments, the system can include a plurality of lamella plates disposed downstream of the flotation region and laterally separated from the mixing region by a first wall, the plurality of lamella plates configured to form a laminar flow of water. In some embodiments, the system can include a second wall below the plurality of lamella plates, the second wall arranged to redirect clarified water laterally to a lateral region underneath the first inlet and the second inlet, the clarified water having an algae content less than that of the algae-containing water. In some embodiments, the system can include a riser channel arranged to redirect the clarified water upwardly, the riser channel separated from the mixing region and the flotation region. In some embodiments, the system can include a second riser channel arranged to redirect the clarified water upwardly, the first and second riser channels on opposing sides of the first inlet. In some embodiments, the system can include a weir box in fluid communication with the riser channel at an upper portion of the riser channel, the riser channel arranged to deliver the clarified water to the weir box. In some embodiments, the system can include an outlet in fluid communication with the weir box. In some embodiments, the weir box comprises a pair of spaced apart weirs along a length of the weir box. In some embodiments, the tank comprises a mixing chamber separated from the algae separation chamber by a partition, the mixing chamber comprising one or more mixers configured to mix one or more chemicals with the algae-containing water, the mixing chamber in fluid communication with the first inlet and disposed upstream of the first inlet. In some embodiments, the mixing chamber comprises a first mixing chamber and a second mixing chamber downstream of the first mixing chamber, the first mixing chamber comprising a first mixer configured to mix a first chemical with the algae-containing water, the second mixing chamber comprising a second mixer configured to mix a second chemical with the algae-containing water. In some embodiments, the system can include a first source of the first chemical in fluid communication with the first chamber and a second source of the second chemical in fluid communication with the second chamber, the first chemical comprising chemical coagulants and the second chemical comprising chemical flocculants. In some embodiments, the system can include a pump configured to drive the algae-containing water through the algae collection chamber. In some embodiments, the pump is configured to drive the algae-containing water to the algae collection chamber at a flow rate in a range of 50 GPM to 900 GPM. In some embodiments, the bubble generator comprises a plurality of nozzles or valves configured to generate bubbles from the gas-containing water. In some embodiments, the bubble generator comprises an impingement plate spaced apart from the nozzles and aligned with stream axes of the nozzles. In some embodiments, the bubble generator comprises at least one valve and a diffuser downstream of and in fluid communication with the at least one valve, the at least one valve configured to provide a pressure drop to remove gas(es) from solution in the gas-containing water, the diffuser configured to distribute the gas-containing water to the mixing region.

In another embodiment, a method of separating algae includes: supplying algae-containing water to a mixing region of an algae separation chamber of a tank; supplying gas-containing water comprising dissolved gas to the mixing region of the algae separation chamber; generating a plurality of bubbles from the gas-containing water; and supplying the plurality of bubbles and the gas-containing water to the mixing region to mix with the algae-containing water.

In some embodiments, the method includes causing the plurality of bubbles from the gas-containing liquid to bond to algae particles in the algae-containing water and floating them to a surface in the flotation region. In some embodiments, the method includes directing the algae-containing water over and through a plurality of lamella plates. In some embodiments, the method includes redirecting clarified water laterally around a wall to a lateral region underneath the first inlet and the second inlet, the clarified water having an algae content less than that of the algae-containing water. In some embodiments, the method includes redirecting the clarified water upwardly to a weir box. In some embodiments, the method supplying the algae-containing water at a flow rate in a range of 50 GPM to 900 GPM. In some embodiments, generating the plurality of bubbles comprises imparting a pressure drop in the gas-containing water with a valve and delivering the gas-containing water to a diffuser, the diffuser distributing the gas-containing water to the mixing region.

BRIEF DESCRIPTION OF THE DRAWINGS

FIGS. 1-1, 1-2, and 1-3 are schematic system diagrams of the algae harvesting system of FIG. 1, according to one embodiment.

DETAILED DESCRIPTION

It can be challenging to separate algae from water, e.g., a natural body of water, such as a lake or river. It is particularly challenging to remove the algae from water without rupturing the algae cells. Various embodiments disclosed herein can beneficially coagulate and flocculate algae cells within an algae separation system. A bubble generator can be provided to intermix gas-containing liquid to bond with the algae particles so as to impart buoyancy to the algae cells. The buoyant algae cells can float to the top of the separation system to be removed from the water. Beneficially, the disclosed embodiments can remove algae from the water without rupturing the algae cells, which can be beneficial in a variety of applications, including reducing or eliminating the emission of methane and/or other harmful constituents from the algae cells.

Figure 1:
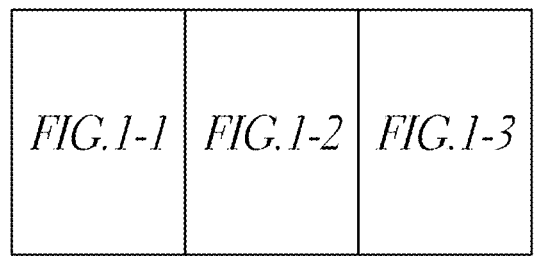
FIG. 1 is a block diagram of an algae harvesting system, according to one embodiment.
Figure 1:
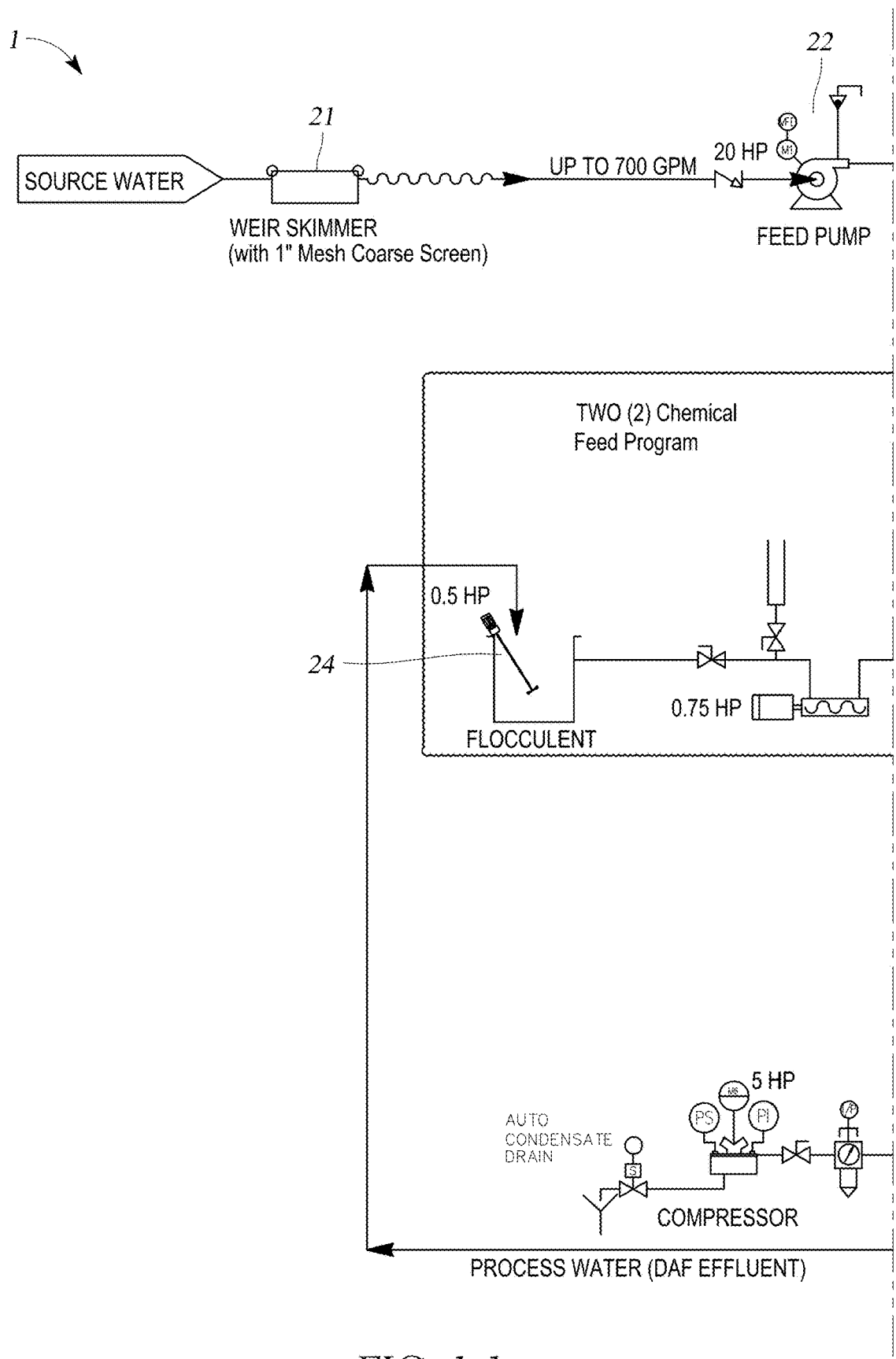
Figure 2A:
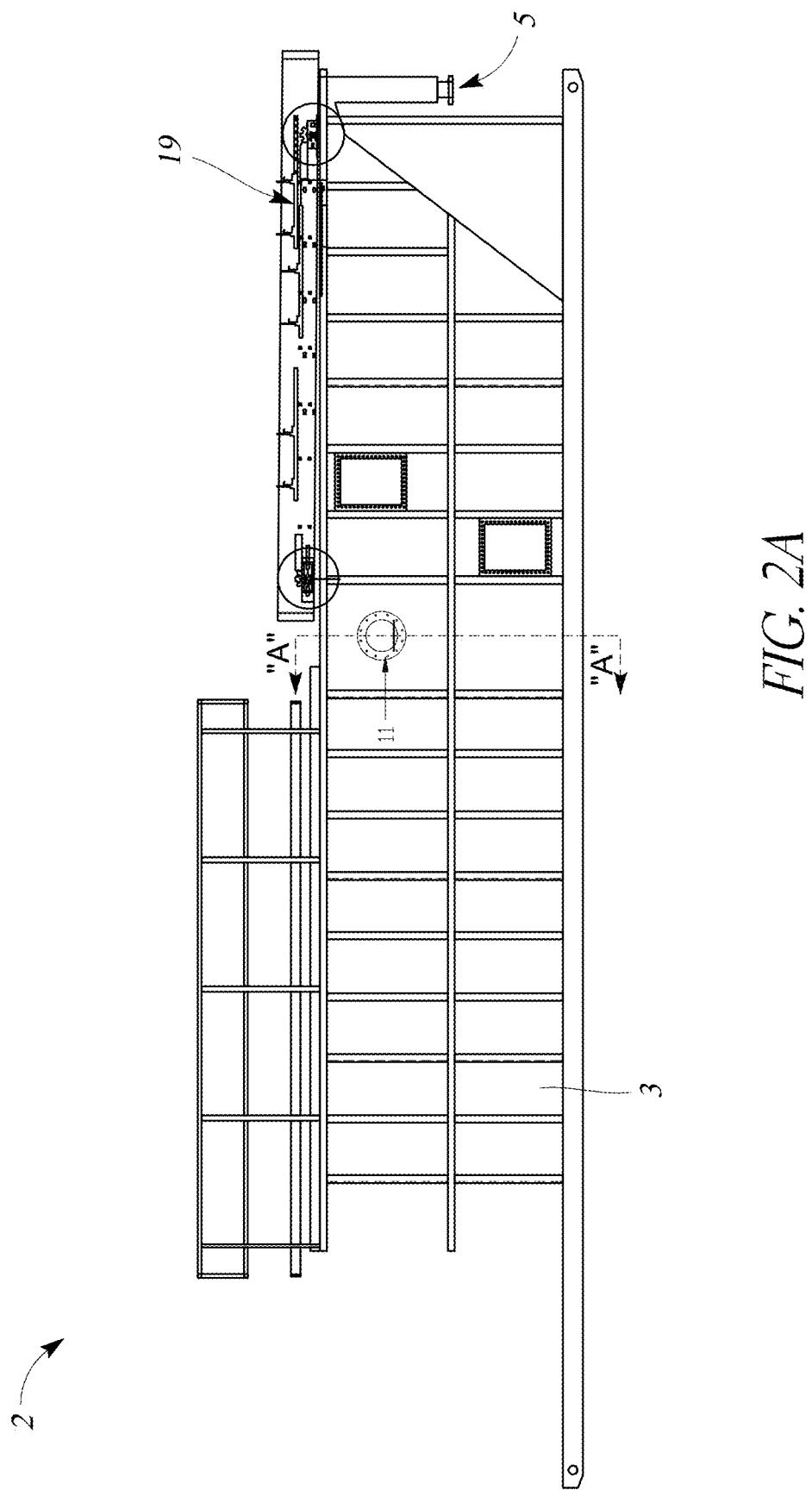
FIG. 2A is a schematic side elevational view of an algae separation system, according to one embodiment.
Figure 2B:
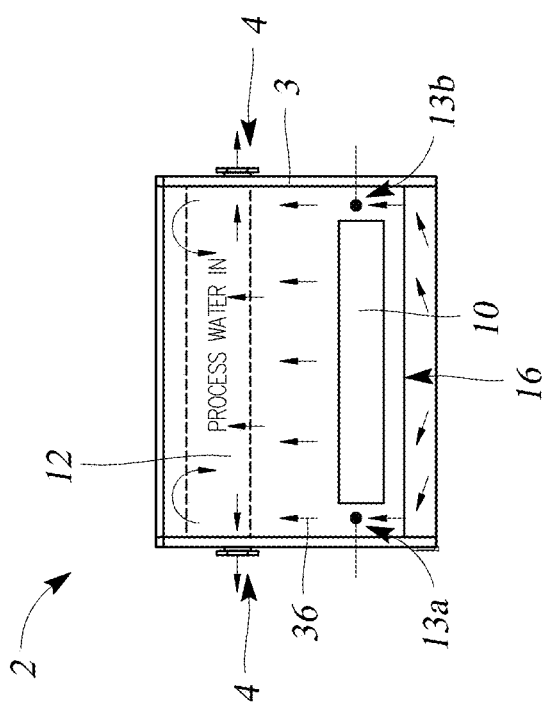
FIG. 2B is a schematic sectional view of the algae separation system taken along Section A-A of FIG. 2A.
Figure 2C:
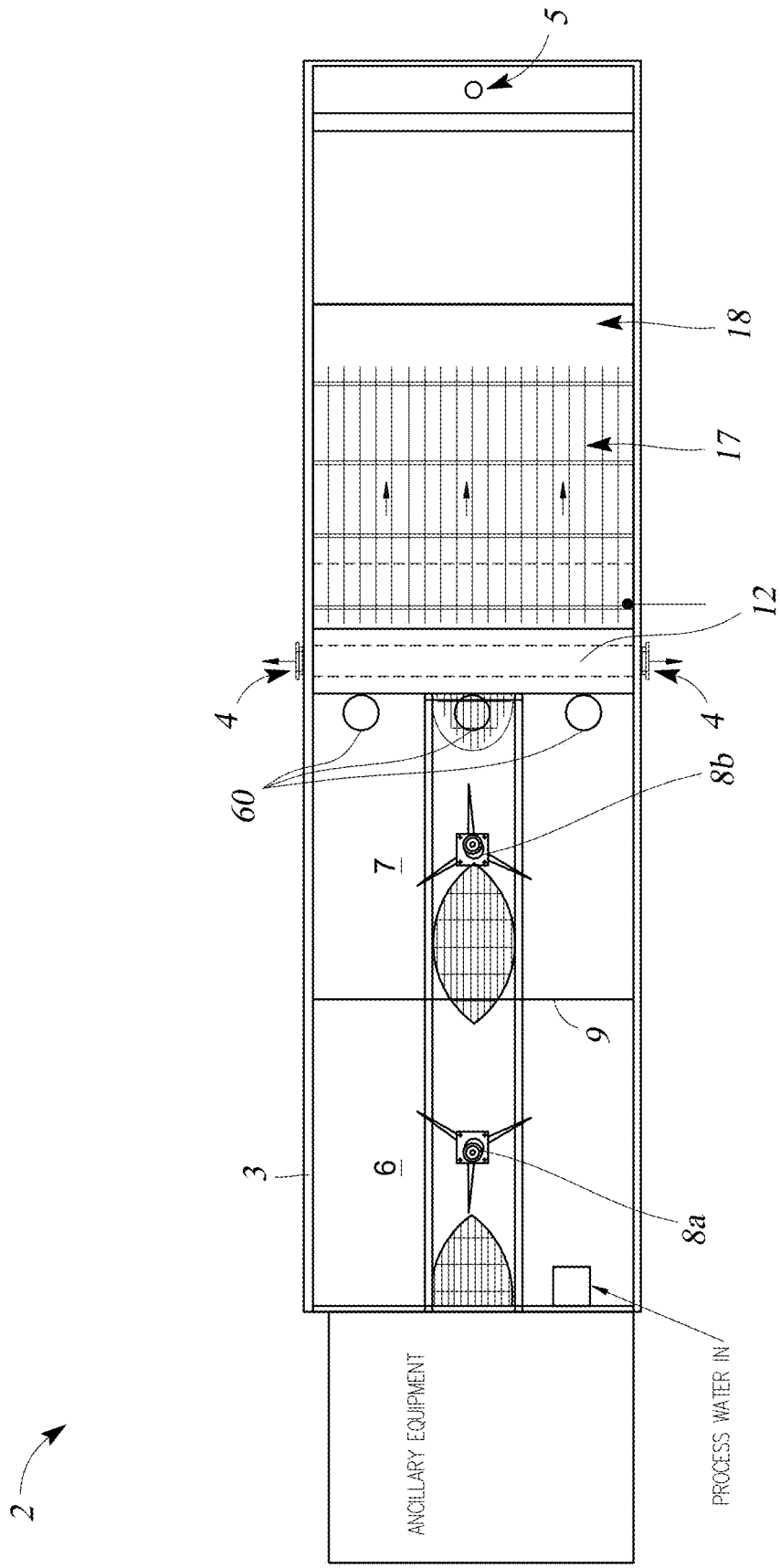
FIG. 2C is a schematic top plan view of the algae separation system of FIG. 2A.
Figure 2D:
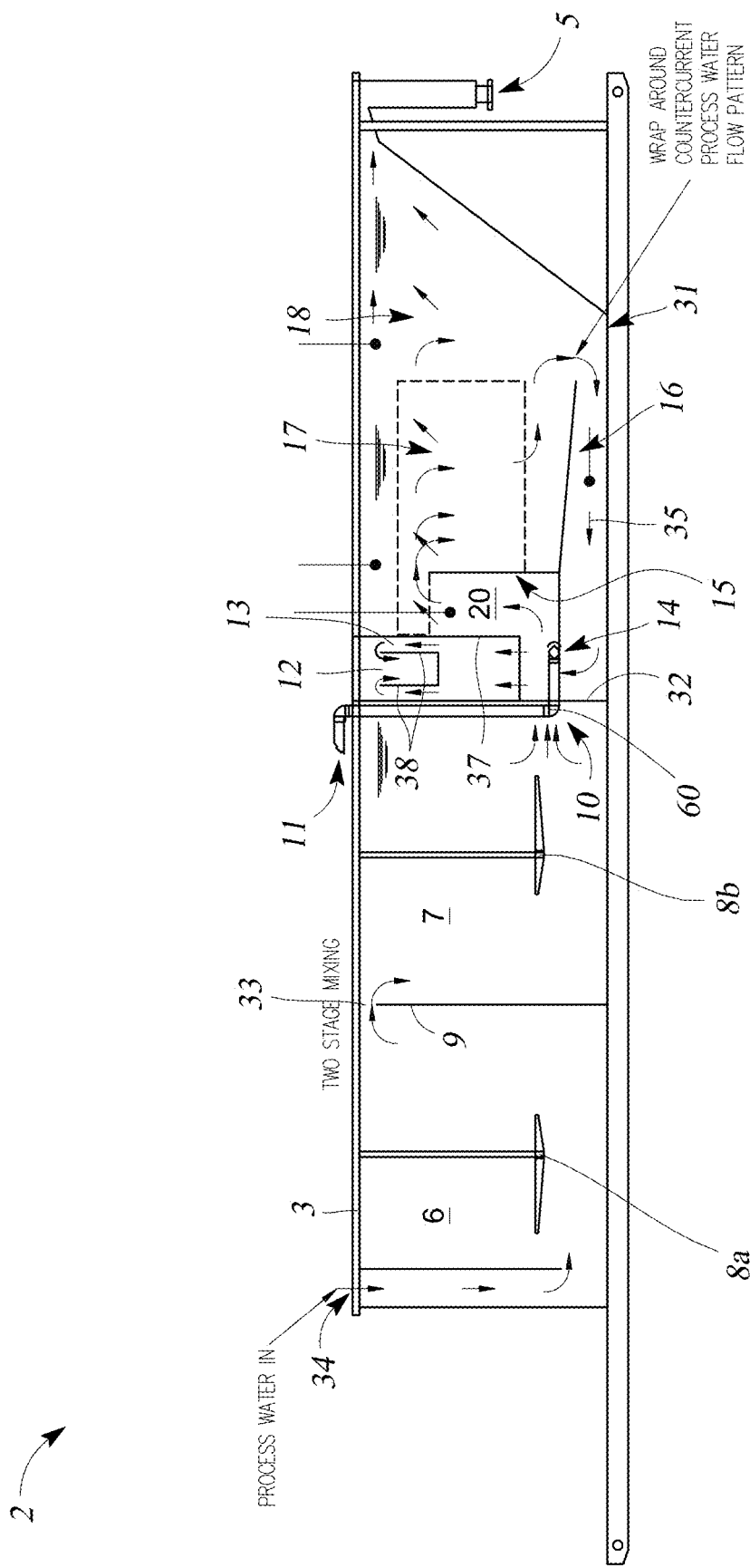
FIG. 2D is a schematic side sectional view of the algae separation system of FIG. 2A.

FIG. 1 is a schematic system diagram of an algae harvesting system 1, according to one embodiment. FIG. 2A is a schematic side view of an algae separation system 2, according to one embodiment. FIG. 2B is a schematic end sectional view of the algae separation system 2 taken along Section A-A of FIG. 2A. FIG. 2C is a schematic top sectional view of the algae separation system 2 of FIG. 2A. FIG. 2D is a schematic side sectional view of the algae separation system 2 of FIG. 2A.

Various embodiments disclosed herein include an algae harvesting system 1, as shown in FIG. 1. The system 1 can be used to separate algae from water in a variety of contexts, including in algae farms, aquaculture operations, and/or in a natural body of water, such as a lake, river, ocean, etc. Thus, the source water can comprise a mixture of water and naturally-occurring algae in the body of water. The water can be collected by a weir skimmer 21, which can include a coarse mesh screen (e.g., about 1" mesh). The skimmed water from the body of water can be pumped into the algae separation system 2 by a feed pump 22. The algae-containing water can pass through a static screen 23 and/or an in-line basket strainer, and can be delivered to a tank 3 of the separation system 2 by way of a supply port 34. As explained herein, a coagulant source 25 can contain a first chemical, such as a chemical coagulant. A flocculant source 24 can contain a second chemical, such as a chemical flocculant. The coagulant source 25 and flocculant source 24 can supply the respective first and second chemicals to the tank 3 to assist in agglomerating the algae for efficient separation from water. Although the illustrated embodiments show separation using a plurality of chemicals (e.g., a coagulant and a flocculant), in other embodiments, only a single chemical can be used for separation (e.g., either a coagulant or a flocculant).

As shown in FIG. 1, algae separated from water within the tank 3 can be conveyed to a removal unit 29 (such as a tanker truck) in the form of a slurry by way of a slurry pump 28. The algae can be removed from the system for safe disposal and/or processing for further use. The clarified water can exit the tank 3 by way of an effluent liquid outlet 4. A portion of the clarified water can be redirected through an air dissolving system 26 and nucleation (phase change) system, also called "release" or "back pressure" valves and into a mixing (contact) zone 20 for mixing with the coagulated and flocculated algae containing stream. A remainder of the clarified water can be conveyed out of the system 1.

As shown in FIGS. 2A-2D, the algae separation system 2 can include a tank 3 having one or more mixing chambers 6, 7 and an algae separation chamber 31 downstream of the one or more mixing chambers 6, 7. The mixing chamber(s) can comprise a first mixing chamber 6 and a second mixing chamber 7 downstream of the first mixing chamber 6. The second mixing chamber 7 can be separated from the first mixing chamber 6 by a separation wall 9. Liquid can flow from the first mixing chamber 6 to the second mixing chamber 7 by way of a pathway 33 between the separation wall 9 and a wall of the tank 3. A partition 32 can separate the one or more mixing chambers (e.g., the second mixing chamber 7) from the algae separation chamber 31. The mixing chambers 6, 7 can respectively include one or more mixers 8a, 8b configured to mix one or more chemicals with algae-containing water. Algae-containing water can be supplied to the first mixing chamber 6 by way of the supply port 34. The first mixer 8a can be configured to mix a first chemical with the algae-containing water in the first mixing chamber 6. In some embodiments, the first chemical can comprise a chemical coagulant. The chemical coagulant can be used to modify a charge of the algae compositions so as to promote agglomeration. In various embodiments, the coagulant can comprise a metal salt coagulant, such as aluminum chlorohydrate (ACH), ferric chloride, and related chemicals, or organic anionic coagulants such as starch based coagulants. The second mixer 8b can be configured to mix a second chemical with the algae-containing water. The second chemical can comprise a chemical flocculant. The flocculant can be used to cause the algae particles to agglomerate to facilitate the efficient collection of algae cells. In various embodiments, the flocculant can comprise an organic flocculant composition, e.g., polyacrylamide and related water-soluble polymers. As explained above, the algae harvesting system 1 can include the first source 25 of the first chemical (e.g., a coagulant) in fluid communication with the first chamber 6 and the second source 24 of the second chemical (e.g., a flocculant) in fluid communication with the second chamber 7.

As shown in FIG. 1, the system 1 can include the pump 22 configured to drive the algae-containing water through the mixing chambers 6, 7 and the algae separation chamber 31. The pump 22 can be operated to convey algae-containing liquid to the system 2 at a flow rate of up to 700 gallons per minute (GPM), up to 800 GPM, or up to 900 GPM. In some embodiments, the pump 22 can be operated to convey algae-containing liquid to the system at a flow rate over 1000 GPM. In some embodiments, the pump 22 can be operated to convey the algae-containing liquid to the tank 3 at a flow rate in a range of 50 GPM to 900 GPM, 50 GPM to 800 GPM, 50 GPM to 700 GPM, 200 GPM to 900 GPM, 200 GPM to 800 GPM, 200 GPM to 700 GPM, 300 GPM to 800 GPM, or 400 GPM to 800 GPM. Beneficially, the use of such high flow rates can enable efficient algae separation for low concentrations of algae relative to the volume of water, e.g., for large bodies of water. In some embodiments, the pump 22 upstream of the tank 3 can be operated at speeds of less than 2000 revolutions per minute (RPMs), less than 1900 RPMs, less than 1800 RPMs, or less than 1750 RPMs, e.g., at speeds in a range of 1000 RPM to 2000 RPM, or in a range of 1200 RPM to 1800 RPM. It should be appreciated that the system 1 disclosed herein can be scalable to any suitable size and flow rate.

A first inlet 10 (e.g., a tunnel) can supply algae-containing water to a mixing region 20 of the algae separation chamber 31. The mixing chambers 6, 7 can be in fluid communication with the first inlet 10 and disposed upstream of the first inlet 10 as shown in FIGS. 2C-2D. A second inlet 11 can supply gas-containing water comprising dissolved gas to the mixing region 20 of the algae separation chamber 31. A bubble generator 14 can be in fluid communication with the second inlet 11. The bubble generator 14 can be configured to generate a plurality of bubbles from the gas-containing water and to supply the plurality of bubbles to the mixing region 20 to mix with the algae-containing water that is supplied by the first inlet 10. In some embodiments, the bubble generator 14 can include a plurality of nozzles configured to generate bubbles (e.g., microbubbles or nanobubbles) from gas dissolved in water supplied by the second inlet 11. In some embodiments, the bubble generator 14 can comprise one nozzle. The bubble generator 14 can further include an impingement plate (not shown) spaced apart from the nozzles and aligned with stream axes of the nozzles.

Figure 2F:
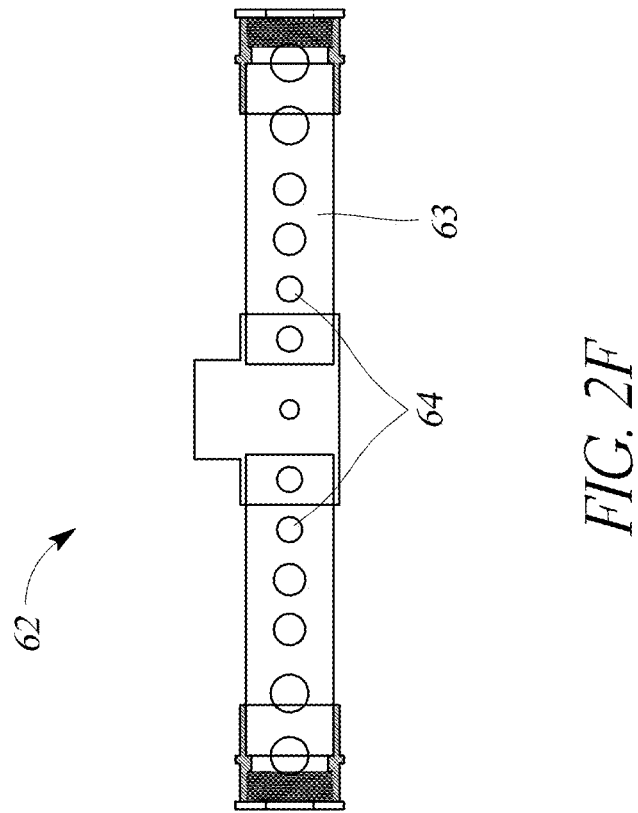
FIG. 2F is a schematic end view of a diffuser of the bubble generator of FIG. 2E.
Figure 2E:
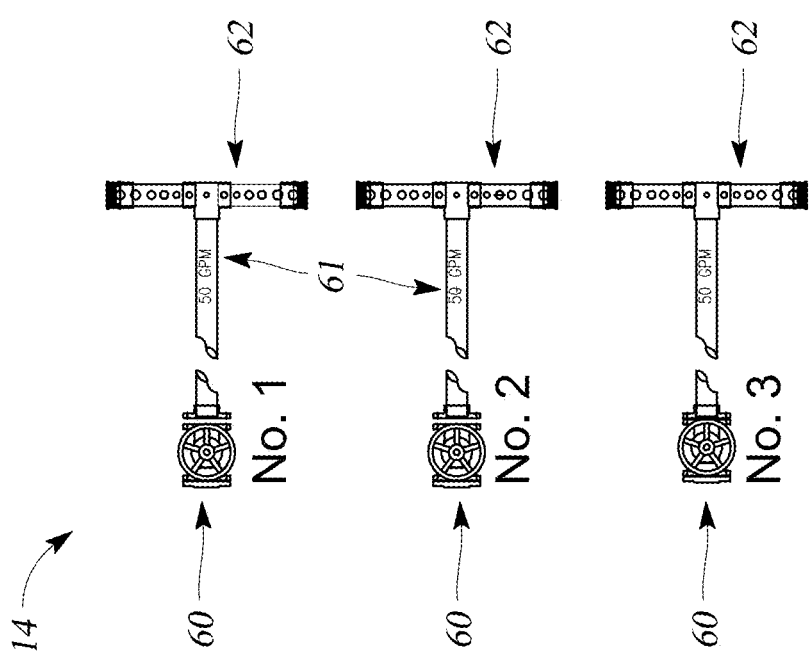
FIG. 2E is a schematic top plan view of a bubble generator, according to various embodiments.

FIG. 2E illustrates a top plan view of the bubble generator 14, according to various embodiments. As shown, the bubble generator can comprise at least one valve 60 connected to at least one diffuser 62 by way of at least one pipe 61. In the illustrated embodiment, the bubble generator 14 includes a plurality (e.g., three) valves 60 and a plurality (e.g., three) associated diffusers 62. It should be appreciated that the bubble generator 14 can comprise any suitable number of valves 60 and diffusers 62. In operation, the valves 60 can be in an almost-closed state to deliver the gas-containing liquid to the diffusers 62 by way of the pipes 61. In various embodiments, the valves 60 can be configured such that a pressure drop across the valves 60 are in a range of 70 psi to 90 psi, e.g., in a range of 75 psi to 85 psi. As an example, in one embodiment, a pressure on an upstream side of the valve 60 can be approximately 80 psi, and a pressure on the downstream side of the valve 60 (e.g., within the pipe 61) can be approximately 1.5 psi to 2 psi. The large pressure drop can allow the gases within the gas-containing liquid to come out of solution. In various embodiments, the first inlet 10 (e.g., a tunnel) can serve as the inlet to the mixing region 12, with the pipes 61 passing through the inlet 10. Clarified water can pass underneath the inlet 10 and rise on each side through the risers 13.

The gas-containing liquid can be conveyed to the diffuser(s) 62 to be mixed with the algae-containing liquid as explained herein. As shown in FIG. 2F, the diffuser 62 can comprise a flange 63 with a plurality of holes 64 spaced apart along a length of the flange 63. The spaced-apart holes 64 can be configured to distribute the gas-containing liquid into the mixing region 20 as explained herein. The holes 64 can have any suitable diameter. In various embodiments, for example, the holes 64 can have diameter(s) in a range of about 1" to 2", or in a range of about 1.25" to about 1.75".

The algae separation chamber can include a flotation region 18 above the first inlet 10 and the bubble generator 14. The bubble generator 14 and the first inlet 10 can be positioned such that the plurality of bubbles from the gas-containing liquid bond to algae particles in the algae-containing water, imparting buoyancy and causing the particles to float in the flotation region 18. A skimmer 19 (see FIG. 1) can be configured to skim separated algae from the algae-containing water in the flotation region 18. The skimmed algae can be removed from the system 1 by way of the algae-slurry outlet 5 and the slurry pump 28 (see FIG. 1) As explained above, the removed algae can be conveyed to the removal unit 29 and the algae can be destroyed, stored, or processed in another manner. The system 2 can include a plurality of lamella plates 17 disposed downstream of (e.g., below) the flotation region 18 and laterally separated from the mixing region 20 by a first wall 15. The plurality of lamella plates 17 can be configured to form a laminar flow of water. The lamella plates 17 can be positioned in other locations as well, including, e.g., upstream of the flotation region 18.

The system 2 can include a second wall 16 below the plurality of lamella plates 17. The second wall 16 can be arranged to redirect clarified water laterally along a redirection pathway 35 to a lateral region underneath the first inlet 10 and the second inlet 11. The clarified water can have an algae content less than that of the algae-containing water. One or more riser channels 13 can be arranged to redirect the clarified water upwardly along an upward pathway 36, as shown in FIGS. 2B and 2D. The riser channel(s) 13 can include a first riser channel 13a that can be separated from the mixing zone 20, for example, by a third wall 37. A second riser channel 13b can be arranged to redirect the clarified water upwardly, with the first and second riser channels 13a, 13b on opposing sides of the first inlet 10. Any suitable number of riser channels 13 can be provided.

The system 2 can include a weir box 12 in fluid communication with the riser channel(s) 13 at an upper portion of the riser channel(s) 12. The riser channel(s) 13 can be arranged to deliver the clarified water to the weir box 12. The weir box 12 can comprise a U-shaped box with two walls 38 extending across a majority of a width of the tank 3. The weir box 12 can maintain a water level in the flotation chamber 31 over a large range of flow rates so that the flotation level stays the same relative to the skimmer(s) 19. The weir box 12 can comprise a pair of spaced apart weirs along a length of the weir box 12 in various embodiments. The outlet 4 can be in fluid communication with the weir box 12 to transfer water out of the tank 3, as shown in FIG. 1.

Beneficially, in some embodiments, the system 1 can separate algae with minimal or no rupture of cells. For example, in one example, an influent flow of algae-containing liquid contained approximately 170 ppb of cyanotoxins, and an effluent flow of the liquid contained approximately 3 ppb of cyanotoxins, indicating minimal or no rupture of cells.

Accordingly, in various embodiments, a method of collecting algae is disclosed. The method can include supplying algae-containing water to a mixing region 20 of an algae separation chamber 31 of a tank 3. The method can include supplying gas-containing water comprising dissolved gas to the mixing region 20 of the algae separation chamber 31. The method can include generating a plurality of bubbles from the gas-containing water. The method can include supplying the plurality of bubbles to the mixing region 20 to mix with the algae-containing water.

In some embodiments, the method can include causing the plurality of bubbles from the gas-containing liquid to bond to or combine with algae particles in the algae-containing water and floating the particles in the flotation region 18 or compartment. The method can include directing the fluid of algae/gas bubble-containing water over a plurality of lamella plates 17. The method can include redirecting clarified water laterally around a wall 16 to a lateral region underneath the first inlet 10 and the second inlet 11, the clarified water having an algae content less than that of the algae-containing water. The method can include redirecting the clarified water upwardly to a weir box 12.

Figures 1, 2:
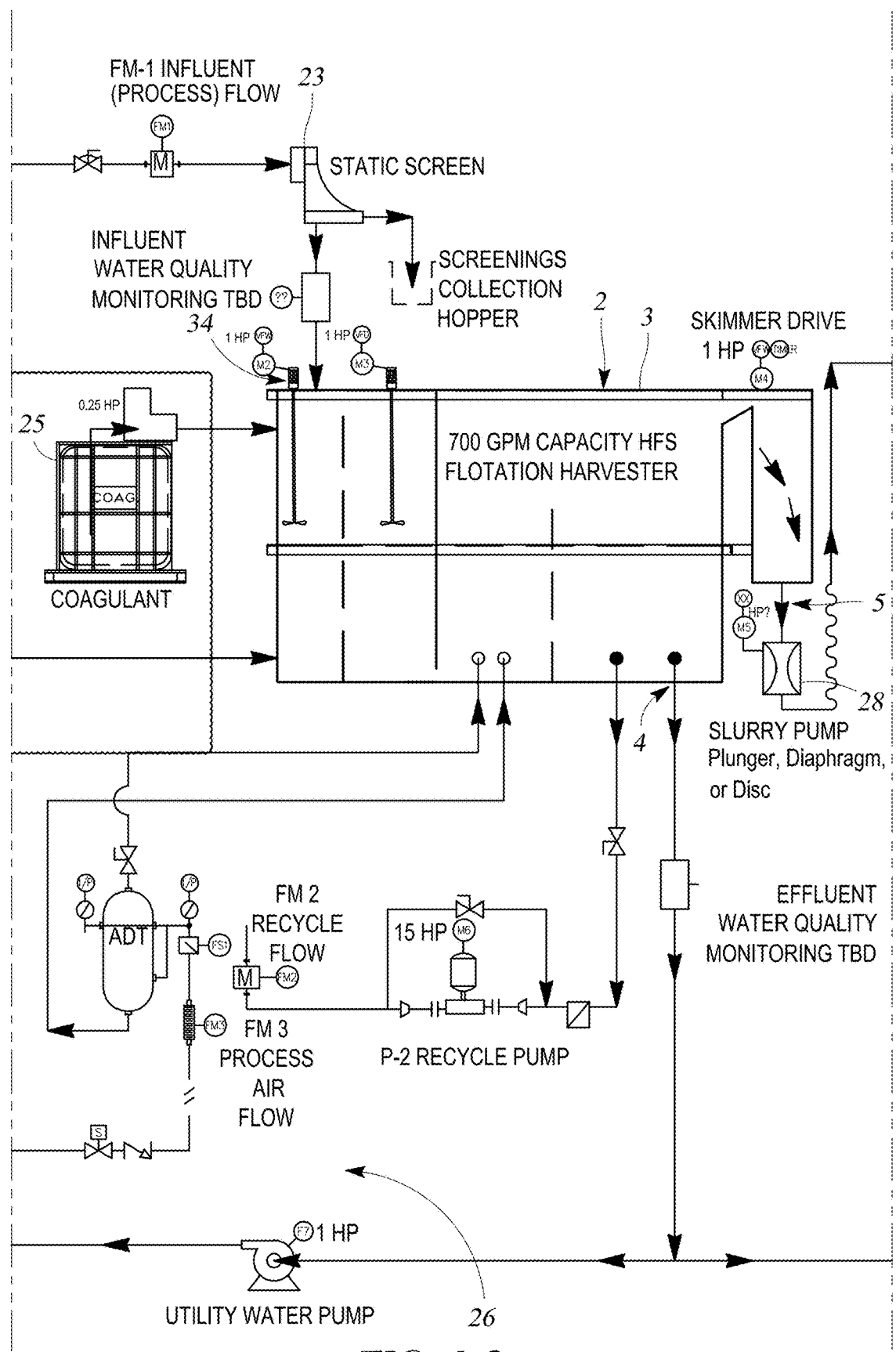
Figures 1, 2, 3:
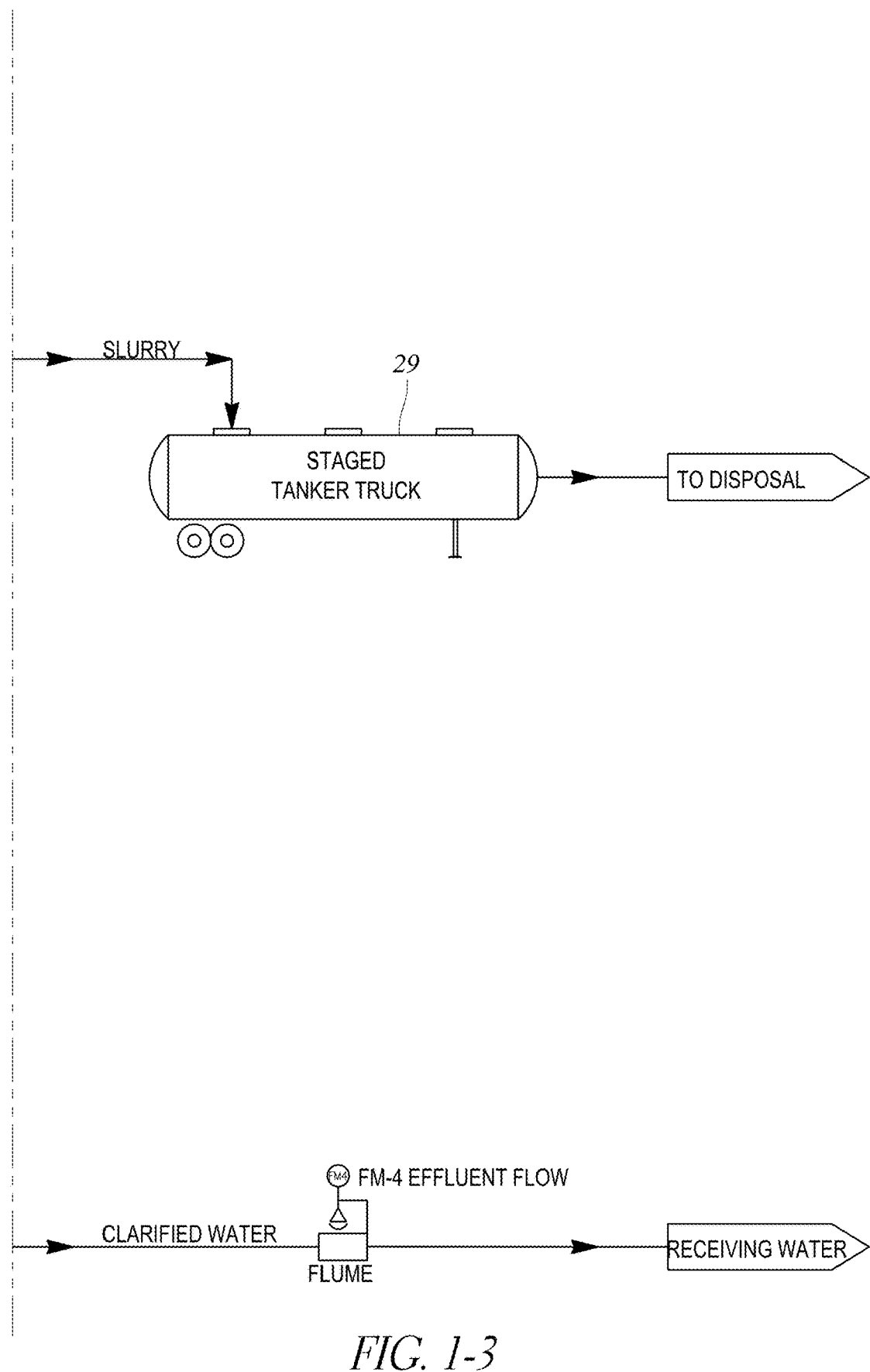
Figure 3A:
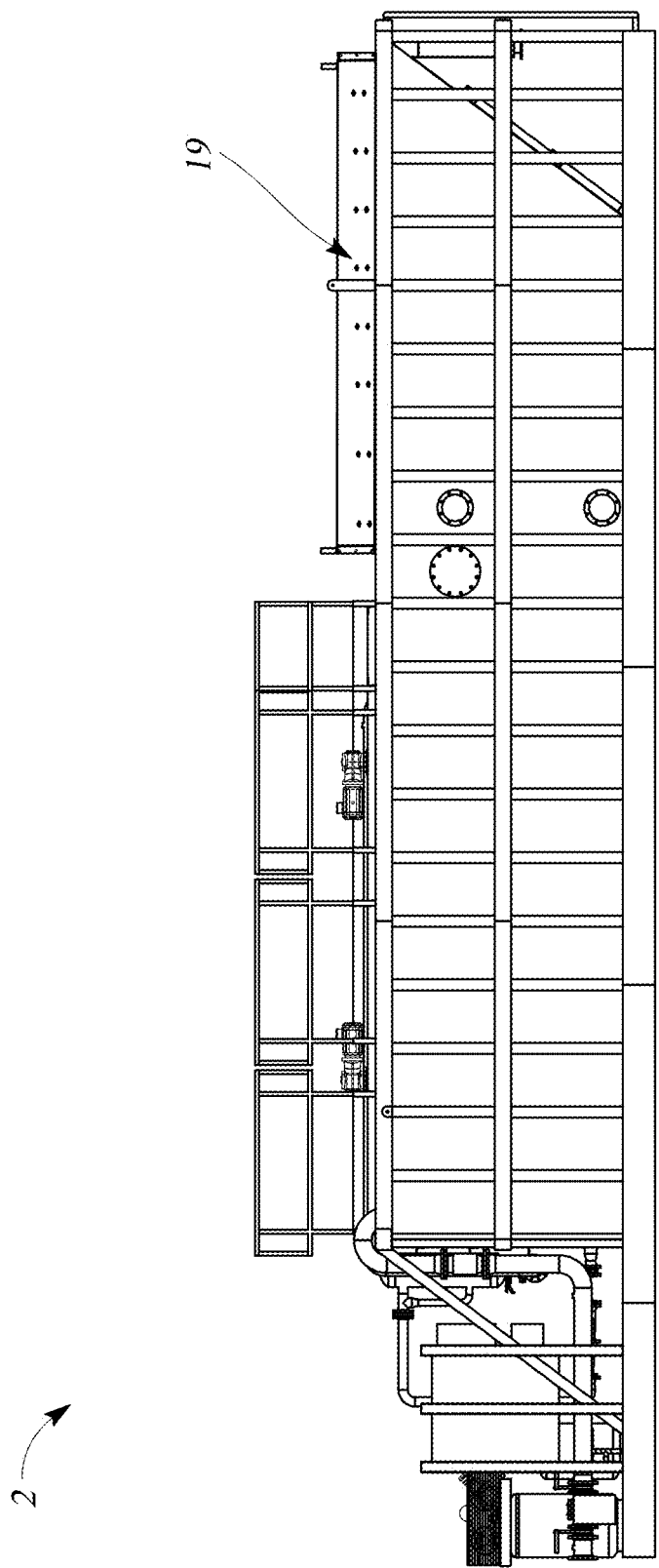
FIG. 3A is a schematic side elevational view of an algae separation system, according to one embodiment.
Figure 3B:
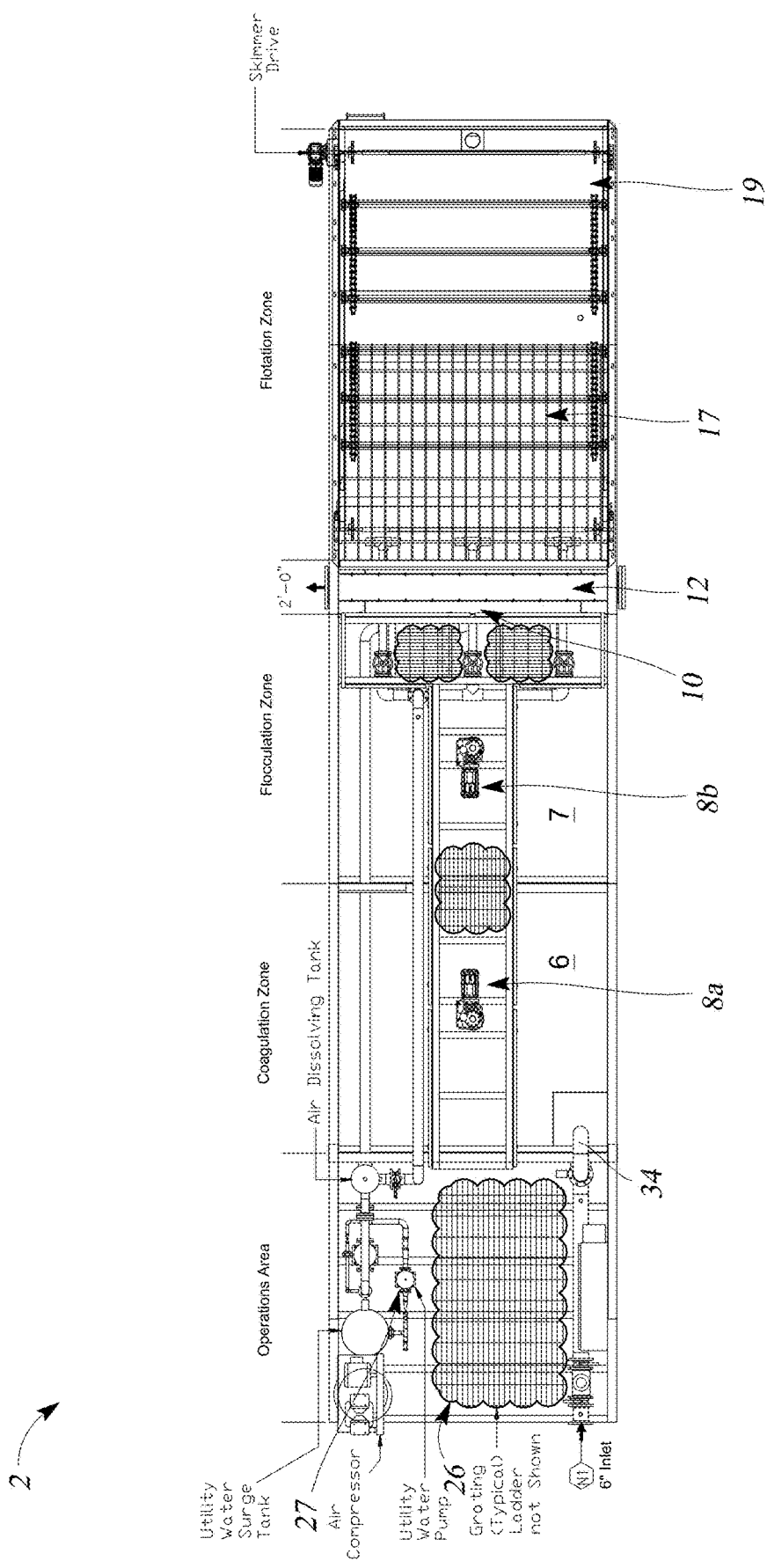
FIG. 3B is a schematic top plan view of the algae separation system of FIG. 3A.
Figures 3C, 3D:
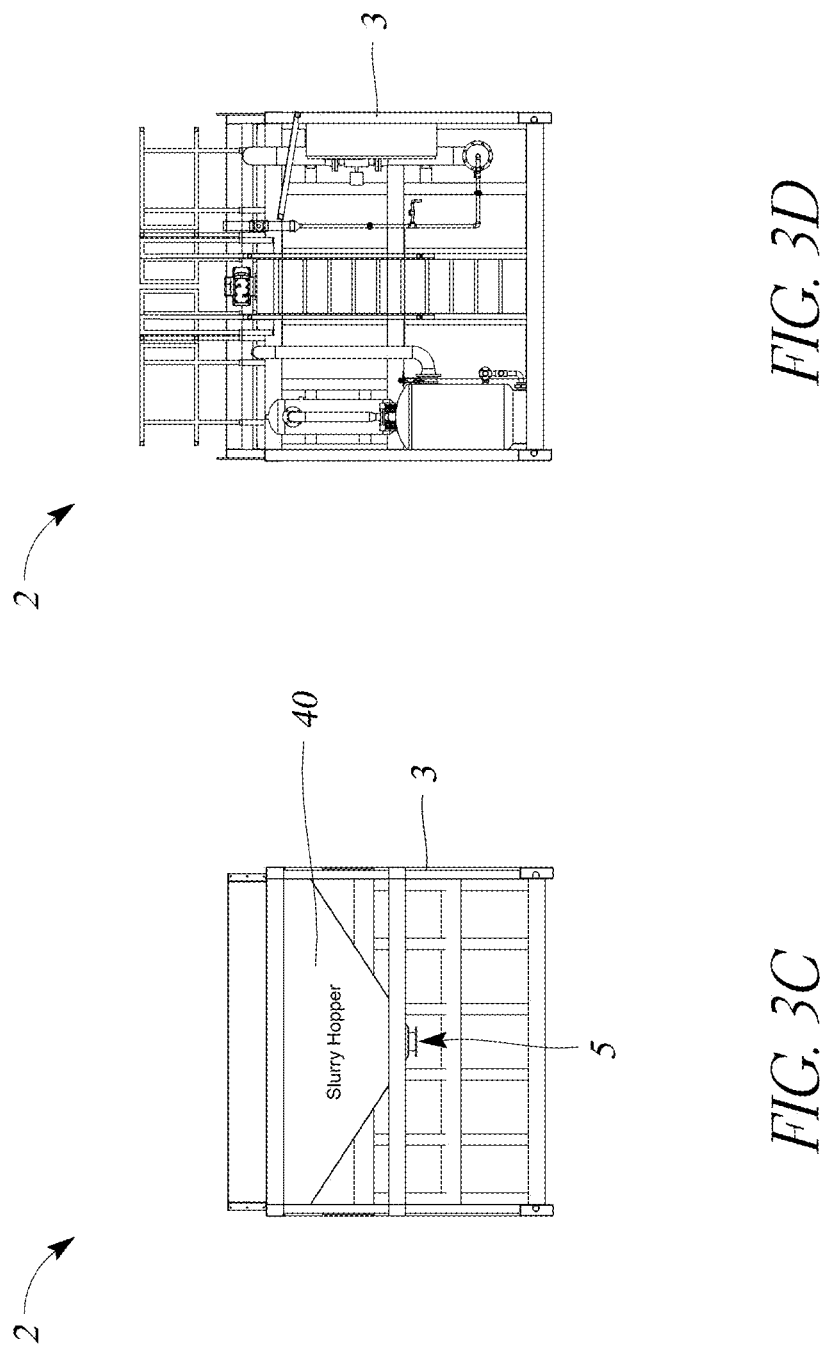
FIG. 3C is a schematic front elevational view of the algae separation system of FIG. 3A.
FIG. 3D is a schematic rear elevational view of the algae separation system of FIG. 3A.

FIGS. 3A-3D illustrate another embodiment of an algae separation system 2. Unless otherwise noted, the components of FIGS. 3A-3D may be the same as or generally similar to like numbered components of FIGS. 1-2D. In addition, as shown in FIG. 3c, a slurry hopper 40 can be provided in communication with the skimmer 19. The slurry of water and collected algae can be driven by the skimmer 19 into the slurry hopper 40 and out of the system 2 by way of the outlet 5.

Although disclosed in the context of certain embodiments and examples, it will be understood by those skilled in the art that the present invention extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the present disclosure. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the aspects that follow.

What is claimed is:

1. An algae separation system comprising:
a tank comprising an algae separation chamber having a flotation region;
a first inlet to supply algae-containing water to a mixing region of the algae separation chamber;
a second inlet to supply gas-containing water comprising dissolved gas to the mixing region of the algae separation chamber;
a bubble generator in fluid communication with the second inlet, the bubble generator configured to generate a plurality of bubbles from the gas-containing water and to supply the plurality of bubbles to the mixing region to mix with the algae-containing water;
a weir box to maintain a water level in the algae separation chamber;
a plurality of lamella plates disposed downstream of the flotation region and laterally separated from the mixing region by a first wall, the plurality of lamella plates configured to form a laminar flow of water; and
a second wall below the plurality of lamella plates;
wherein the first inlet is positioned below the weir box to supply the algae-containing water to the mixing region;
wherein the flotation region is positioned above the first inlet and the bubble generator, the bubble generator and the first inlet positioned such that the plurality of bubbles from the gas-containing liquid bond to algae particles in the algae-containing water and float the algae particles in the flotation region;
wherein the second wall is arranged to redirect clarified water laterally to a lateral region underneath the first inlet and the second inlet, the clarified water having an algae content less than that of the algae-containing water.

2. The system of claim 1, further comprising a skimmer configured to skim separated algae from a surface of the flotation region.

3. The system of claim 1, further comprising a first riser channel arranged to redirect the clarified water upwardly, the first riser channel separated from the mixing region and the flotation region.

4. The system of claim 3, further comprising a second riser channel arranged to redirect the clarified water upwardly, the first and second riser channels on opposing sides of the first inlet.

5. The system of claim 3, wherein the weir box is in fluid communication with the first riser channel and the second riser channel, the first riser channel and the second riser channel configured to deliver the clarified water to the weir box.

6. The system of claim 5, further comprising an outlet in fluid communication with the weir box.

7. The system of claim 5, wherein the weir box comprises a pair of spaced apart weirs along a length of the weir box.

8. The system of claim 1, wherein the mixing chamber comprises one or more mixers configured to mix one or more chemicals with the algae-containing water, the mixing chamber in fluid communication with the first inlet and disposed upstream of the first inlet.

9. The system of claim 8, wherein the mixing chamber comprises a first mixing chamber and a second mixing chamber downstream of the first mixing chamber, the first mixing chamber comprising a first mixer configured to mix a first chemical with the algae-containing water, the second mixing chamber comprising a second mixer configured to mix a second chemical with the algae-containing water.

10. The system of claim 9, further comprising a first source of the first chemical in fluid communication with the first chamber and a second source of the second chemical in fluid communication with the second chamber, the first chemical comprising chemical coagulants and the second chemical comprising chemical flocculants.

11. The system of claim 1, further comprising a pump configured to drive the algae-containing water through the algae collection chamber.

12. The system of claim 11, wherein the pump is configured to drive the algae-containing water to the algae collection chamber at a flow rate in a range of 50 GPM to 900 GPM.

13. The system of claim 1, wherein the bubble generator comprises a plurality of nozzles or valves configured to generate bubbles from the gas-containing water.

14. The system of claim 13, wherein the bubble generator comprises an impingement plate spaced apart from the nozzles and aligned with stream axes of the nozzles.

15. The system of claim 13, wherein the bubble generator comprises at least one valve and a diffuser downstream of and in fluid communication with the at least one valve, the at least one valve configured to provide a pressure drop to remove gas(es) from solution in the gas-containing water, the diffuser configured to distribute the gas-containing water to the mixing region.

16. The algae separation system of claim 1, wherein the first inlet is in fluid communication with the second inlet.

17. The system of claim 15, wherein a first pressure upstream of the at least one valve is greater than a second pressure downstream of the at least one valve.

18. The system of claim 17, wherein the first pressure is greater than the second pressure from about 70 psi to about 90 psi.

19. An algae separation system comprising:
a tank comprising an algae separation chamber;
a first inlet to supply algae-containing water to a mixing region of the algae separation chamber;
a second inlet to supply gas-containing water comprising dissolved gas to the mixing region of the algae separation chamber; and
a bubble generator in fluid communication with the second inlet, the bubble generator configured to generate a plurality of bubbles from the gas-containing water and to supply the plurality of bubbles to the mixing region to mix with the algae-containing water; and
a wall below the mixing region, the wall arranged to redirect clarified water laterally to a region below the first inlet and the second inlet, the clarified water having an algae content less than that of the algae-containing water;
wherein, during operation of the system, the wall directs the clarified water to flow in a first direction, to flow around the wall, and to flow in a second direction different from the first direction.

20. The algae separation system of claim 19, wherein the wall below the mixing region is angled towards a bottom surface of the tank.

21. An algae separation system comprising:
a tank comprising an algae separation chamber;
a first inlet to supply algae-containing water to a mixing region of the algae separation chamber;
a second inlet to supply gas-containing water comprising dissolved gas to the mixing region of the algae separation chamber; and
a bubble generator in fluid communication with the second inlet, the bubble generator configured to generate a plurality of bubbles from the gas-containing water and to supply the plurality of bubbles to the mixing region to mix with the algae-containing water;
a first riser channel and a second riser channel separated from the mixing region of the algae separation chamber by a wall, and arranged to redirect clarified water upwardly during operation of the system;
a weir box in fluid communication with the first riser channel and the second riser channel, the first and second riser channels arranged to deliver the clarified water to the weir box during operation of the system;
an outlet in fluid communication with the weir box;
a second wall below the mixing region, the second wall arranged to redirect clarified water laterally to a region below the first inlet and the second inlet, the clarified water having an algae content less than that of the algae-containing water;
wherein, during operation of the system, the second wall directs the clarified water to flow in a first direction, to flow around the second wall, and to flow in a second direction different from the first direction.

22. The algae separation system of claim 21, wherein the weir box is positioned between the first riser channel and the second riser channel.

23. The algae separation system of claim 21, wherein the outlet is positioned between the first and second riser channels.

* * * * *